(12) United States Patent
Berry, III

(10) Patent No.: US 9,113,215 B1
(45) Date of Patent: Aug. 18, 2015

(54) INTERACTIVE ADVERTISING AND MARKETING SYSTEM

(76) Inventor: Lincoln Berry, III, Dayton, OH (US)

( * ) Notice: Subject to any disclaimer, the term of this patent is extended or adjusted under 35 U.S.C. 154(b) by 5 days.

(21) Appl. No.: 13/136,423

(22) Filed: Aug. 1, 2011

Related U.S. Application Data

(60) Provisional application No. 61/400,582, filed on Jul. 30, 2010.

(51) Int. Cl.
| | |
|---|---|
| *G06F 3/00* | (2006.01) |
| *G06F 17/30* | (2006.01) |
| *H04N 21/4725* | (2011.01) |
| *H04N 21/4728* | (2011.01) |
| *H04N 21/858* | (2011.01) |
| *H04N 21/234* | (2011.01) |
| *H04N 21/4722* | (2011.01) |

(52) U.S. Cl.
CPC ...... *H04N 21/4725* (2013.01); *G06F 17/30817* (2013.01); *H04N 21/23412* (2013.01); *H04N 21/4722* (2013.01); *H04N 21/4728* (2013.01); *H04N 21/8583* (2013.01)

(58) Field of Classification Search
CPC .......... H04N 21/4725; H04N 21/8583; H04N 21/23412; H04N 21/4722; H04N 21/4728
USPC .................................................... 725/40, 60
See application file for complete search history.

(56) References Cited

U.S. PATENT DOCUMENTS

| | | | | |
|---|---|---|---|---|
| 6,496,981 | B1 * | 12/2002 | Wistendahl et al. | 725/112 |
| 6,637,028 | B1 * | 10/2003 | Voyticky et al. | 725/42 |
| 7,325,245 | B1 * | 1/2008 | Clapper | 725/54 |
| 7,814,511 | B2 | 10/2010 | Macrae et al. | |
| 7,979,877 | B2 | 7/2011 | Huber et al. | |
| 2002/0059584 | A1 * | 5/2002 | Ferman et al. | 725/34 |
| 2002/0162117 | A1 | 10/2002 | Pearson et al. | |
| 2003/0028873 | A1 | 2/2003 | Lemmons | |
| 2006/0259930 | A1 * | 11/2006 | Rothschild | 725/81 |
| 2006/0268007 | A1 | 11/2006 | Gopalakrishnan | |
| 2007/0192164 | A1 * | 8/2007 | Nong et al. | 705/10 |
| 2008/0154908 | A1 * | 6/2008 | Datar et al. | 707/10 |
| 2009/0144772 | A1 * | 6/2009 | Fink et al. | 725/42 |
| 2009/0276805 | A1 * | 11/2009 | Andrews, II et al. | 725/35 |
| 2010/0086283 | A1 * | 4/2010 | Ramachandran et al. | 386/95 |

\* cited by examiner

*Primary Examiner* — Benjamin R Bruckart
*Assistant Examiner* — Carmine Malangone
(74) *Attorney, Agent, or Firm* — Mark F. Smith; Smith Brandenburg LTD

(57) ABSTRACT

The current invention is an interactive advertising and marketing system that operates to provide users with an opportunity to identify objects within video media and create virtual hotspots with respect to the objects, which allows viewers the ability to select objects within the video media that are associated with one of the hotspots, and transmits their interest in the selected object to one or more users. Preferably, the system operates such that hotspots can be created for previously created video, newly created video media, as well as live broadcasts.

6 Claims, 13 Drawing Sheets

INTERACTIVE ADVERTISING AND MARKETING SYSTEM

CROSS-REFERENCE TO RELATED APPLICATION

The present application claims benefit of U.S. Provisional Patent Application having Ser. No. 61/400,582, filed Jul. 30, 2010, the disclosure of which is hereby incorporated by reference in its entirety.

BACKGROUND OF THE INVENTION

The present invention relates to a video advertisement and marketing system, and more particularly to a video advertising and marketing system using video media that provides a collaborative process in which users, such as advertisers, can incorporate material, such as advertisements, products, objects, or other information, material and items (hereinafter referred collectively as "objects"), in various video media, preferably digital video media, and whereby viewers can communicate with said users concerning the object. In a preferred embodiment, the system allows users, to identify objects within a video media, such as used in television broadcasts and clips, DVD's and BLU-RAY optical discs, movies and movie clips, music videos, video files, streaming videos over Internet, and other such video media (hereinafter referred collectively as "video media"); and permits viewers to select objects within such video media and utilize the advertisement and marketing system to communicate and interact with users and other viewers.

Audiences today are often confronted with a daily surplus of social information that competes for an individual's attention in almost every aspect of their work, recreation, and social lives. A popular form of advertising on large private or public networks, such as the Internet, is through the use of video files that provide short digital video transmissions, known as "streaming." Individuals also generally frequently view web sites to obtain information, such as news, weather information, entertainment information, broadcast information, much of which is communicated using digital video files. Such individuals also utilize other various video media for obtaining information and communicating with other viewers. Thus, because such media provides access to a large population, businesses seek and use such media to advertise their products and services.

Use of advertising in such video media has increased significantly in recent years with the advent of new telecommunication means, including cell phones, texting, TWITTER and the Internet. Such telecommunication means have been successful in connecting large numbers of people through various means that include online bulletin boards, Email, Tweeting, and online instant messaging. Accordingly, a single video media is often shared among a great number of people.

An assortment of such video media that is frequently viewed or downloaded contain hotspots (certain defined "clickable" areas in a digital video media) that have been embedded or incorporated within the video media. Such hotspots include defined areas that are typically associated with an image shown in the video media such that when the viewer "clicks" on an area incorporating the hotspot a certain action results. This action may include establishing communication with a user, such as an advertiser, by use of a hyperlink to an advertiser's web site. One problem with use of conventional hotspots is that each hotspot corresponding to an object must be placed within the video media prior to viewing by the public. This embedding process is relatively time consuming and expensive. Further, older video media, would not have the incorporation of embedded hotspots, and therefore could not be used by advertisers. Another problem with the use of conventional hotspots is that the embedded hotspots in a video media are usually permanent and cannot be removed, or changed, or additional hotspots added except by making such changes to each video media, such as individual movies, DVD's, video files, and the like. Further, current systems incorporating hotspots in video media cannot be used to incorporate or embedded hotspots in live video broadcasts, such as a live television broadcast.

Accordingly, what is needed is an interactive advertising and marketing system for video media that provides a system and process in which users, such as advertisers, can identify objects within a video media, including previously recorded video media and live broadcasts, that allows users to add, subtract and modify hotspots, and which allows viewers to select objects and communicate with and interact with users.

SUMMARY OF THE INVENTION

The current invention is an interactive advertising and marketing system that operates to provide users with an opportunity to identify objects within video media and create virtual hotspots with respect to the objects, which allows viewers the ability to select objects within the video media that are associated with one of the hotspots, and transmits their interest in the selected object to one or more users. Preferably, the system operates such that hotspots can be created for previously created video, newly created video media, as well as live broadcasts.

In a preferred embodiment of the invention, the interactive advertising and marketing system of the subject invention provides users with means for receiving information, such as specific business information concerning the viewer's demographics and other information concerning the effectiveness of the advertising.

In another preferred embodiment of the invention the interactive advertising and marketing system allows advertising to be incorporated into video media whereby viewers can select "click" objects and interact with users.

In another preferred embodiment of the invention the interactive advertising and marketing system provides users the ability to obtain viewer information for sending trackable coupons, maps, and other customized information materials to the viewers.

In another preferred embodiment of the invention the interactive advertising and marketing system provides users with the ability to add, subtract and edit hotspots associated with objects within a specific video media.

In another preferred embodiment of the invention the interactive advertising and marketing system provides users with means for selecting targeted geographic and/or demographic audiences.

In another preferred embodiment of the invention the interactive advertising and marketing system provides users the ability to receive marketing reports ("analytics") that provide information concerning advertising effectiveness.

In another preferred embodiment of the invention the interactive advertising and marketing system provides users the ability to embed hotspots into various video media that can be transmitted to other viewers such as by Email, TWITTER communication, FACEBOOK pages, and other similar communication systems.

In another preferred embodiment of the invention, the advertising and marketing system operates to place a viewer's display device adapted for receiving transmission of video media in communication with the system for identifying hotspots within a video media.

In another preferred embodiment of the invention the advertising and marketing system operates to create a display having a sign-up field that when selected by the viewer the system software operates to register the viewer with the system.

In a preferred embodiment of the invention the system software operates in conjunction with the video display such that when material is selected by a viewer the video display transfers a video image ("snapshot" or "screenshot") of the video media to the system which then directs the system software to operate and calculate the coordinates of the area selected by the user and stores the video image in a data bank or "cloud".

In another preferred embodiment of the interactive advertising and marketing system the video media is operable on assortment of devices capable of viewing video media.

In a preferred embodiment of the interactive advertising and marketing system, the assortment of devices are capable of utilizing web pages, Emails, Twitter feeds, cellular transmittals, cellular text messages, Internet instant messages, and social network systems.

Preferably the interactive advertising and marketing system for use by users for advertising and marketing objects in a video media and by viewers for selecting such objects, comprises a data bank having a plurality of hotspots, each hotspot is directed to a corresponding object, a viewer video display device operable for receiving and displaying a video media, a selection device or method for selecting an object in the video media, and a system framework in communication with the data bank "cloud" and the viewer display device and operable for determining if a hotspot exists for the selected object; wherein if a hotspot exists for the selected object, the user/viewer module directs the video display device to generate a dialogue (such as a window) for allowing a viewer to correspond with a user.

In a preferred embodiment, the viewer video display device is selected from the group consisting of televisions, cellular telephones, computer displays, personal digital assistants, and video game consoles.

In another preferred embodiment the system framework operates to allow users to add, subtract, or modify hotspots for objects stored in the cloud.

In another preferred embodiment the system framework operates to record the demographics of viewers and videos media being viewed by the viewers.

In another preferred embodiment the system framework operates to connect a viewer video display device with a user website.

Another preferred embodiment of the invention is a method of advertising and marketing comprising the steps of: identifying a viewer, the viewer selecting an object in a video media, calculating the coordinates of the selected object, using the coordinates to identify any hotspots for the object in the video media, using the hotspot to identify the object and a user associated with the object, and providing a dialogue whereby the viewer and the user may communicate.

In a preferred embodiment of the invention the video media is displayed on a viewer display device.

In a preferred embodiment the connection whereby a viewer can contact the user is an Internet connection.

In a preferred embodiment the connection whereby a viewer can contact the user is in the form of a dialogue, such as a window, appearing on the viewer's display device.

In a preferred embodiment of the invention the dialogue operates to allow a viewer to receive and transmit messages to other viewers.

In a preferred embodiment of the invention the dialogue operates to allow a user to receive and transmit messages to viewers.

A preferred embodiment of the invention is a method of advertising and marketing comprising a framework for performing the steps of at least one user selecting at least one object in a video media, overlaying a hotspot for each selected at least one object in the video media such that the hotspots overlay the video media, and viewing the video media on a viewer video display by at least one viewer wherein when at least one object is selected, the framework operates to provide communication between at least one user and at least one viewer.

These and other benefits, advantages, and embodiments of the invention will be apparent from the following description, the accompanying drawings and the appended claims.

BRIEF DESCRIPTION OF THE DRAWINGS

Features, aspects, and advantages of the present invention will become better understood with regard to the following description, appended claims, and accompanying drawings where:

DETAILED DESCRIPTION OF THE PREFERRED EMBODIMENT

The present invention solves the prior art problems discussed above and provides a distinct advance in the state of the art. The current invention is an interactive advertising and marketing system that operates to provide users with an opportunity to identify objects within video media and create hotspots within such video media, which allows viewers the ability to select ("click") objects within the video media that are associated with one of the hotspots, and transmits their interest in the object to a user. Preferably the system operates such that hotspots can be created for previously created video, newly created video media, as well as live broadcasts.

Figure 1:
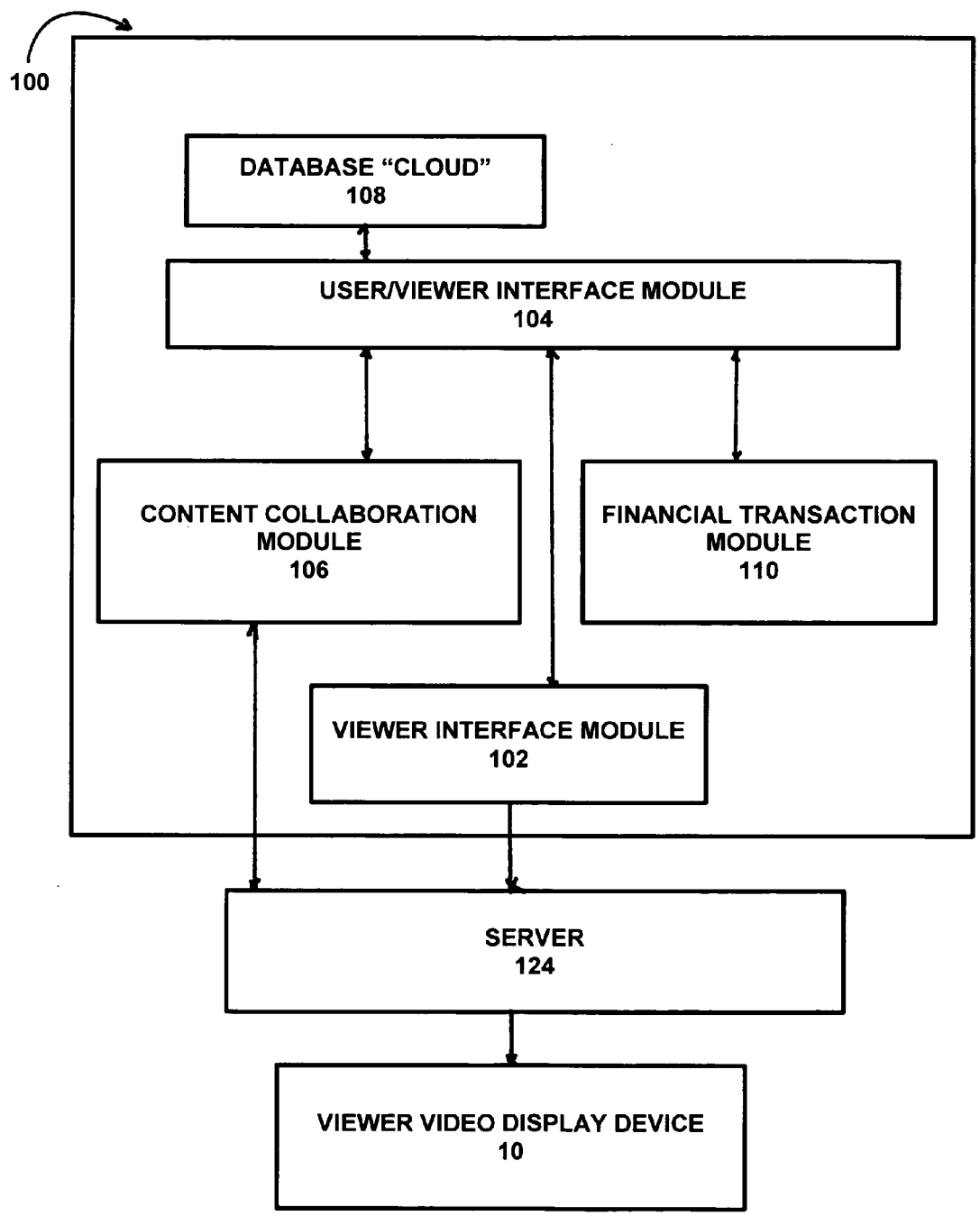
FIG. 1 is a diagrammatic representation showing the general methodology of the interactive advertising and marketing system of the subject invention showing a user/viewer interface module, a content collaboration module, a viewer interface module, and a financial transaction module, and having a database or cloud for storing information.

In a preferred embodiment, as shown in FIG. 1, the interactive advertising and marketing system 100 comprises a system framework 101 having a viewer interface module 102 for communicating with a viewer through the viewer's video display device 10, a user/viewer interface module 104 in communication with the viewer interface module 102 to receive and transmit information concerning an object, a content collaboration module 106 for allowing users to work together in populating a data bank or "cloud" 108, and a financial transaction module 110 for carrying on a financial transaction between a viewer and a user.

Figure 2:
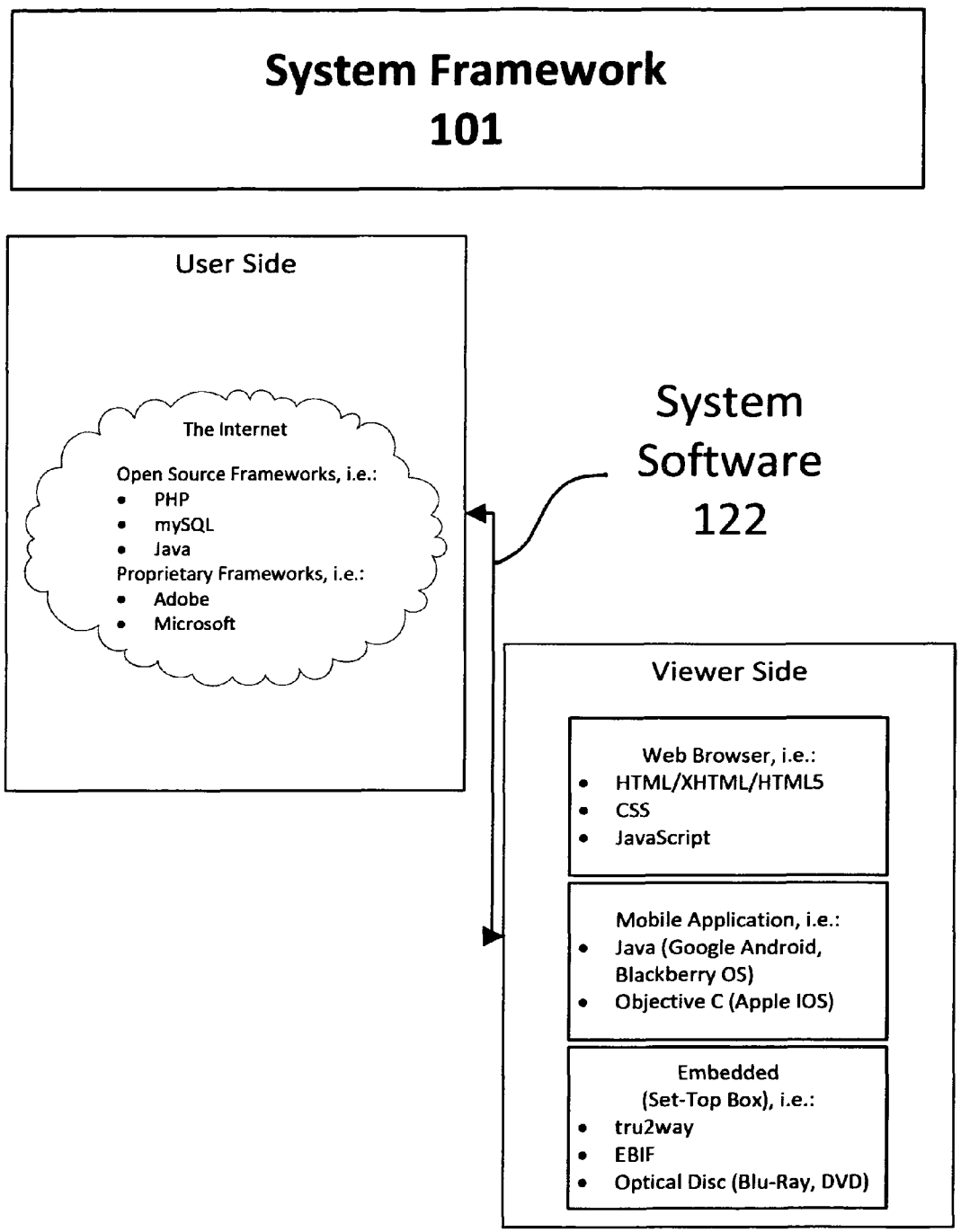
FIG. 2 is a diagrammatic representation showing a preferred embodiment of the system framework of system software for use by users and viewers in implementing the interactive advertising and marketing system of the subject invention.

The viewer interface module 102 operates for receiving incoming messages and alerts (i.e. RSS feed), and dispatches messages and alerts (i.e. HTTP requests, URL/URI encoded streams) from and to a viewer's video display device 10. Further, the viewer interface module 102 also operates to hosts "widgets" (i.e. small runtime applets, such as games or informational dialogues that function independently of one another). Preferably, as shown in FIG. 2, the viewer interface module 102 includes an application programming interface 112 operable for use with interactive television software (such as JAVA TV from Oracle Corporation) and alongside of or on top of other existing software frameworks such as across a broadcast television interface 114 (such as "TRU2WAY" interactive digital cable services system from Cable Television Laboratories, Inc.; ANDROID software stack from Google Inc.; Google TV participatory information system from Google Inc.; and "TIVO" digital video recording by TiVo, Inc.) and/or an Internet (web) application interface 116 that uses a multimedia platform for adding video to Internet web sites 12 (such as ADOBE FLASH from Adobe Systems). The viewer interface module 102 utilizes an appropriate scripting language for controlling one or more applications (such as ECMA SCRIPT from Ecma International). It should be understood that the Internet (web) application interface 116 can operate utilizing any fully-realized runtime code using an appropriate language for structuring and presenting content on the Internet (such as HTML5) thereby allowing the Internet (web) application interface 116 to be accessed and communicate with a variety of web browsers and web sites 12 having meta-file format or container file format (Flash Video). In this way a viewers' video display device 10 can comprise computer displays and other devices accessing video media through various Internet web sites 12 or IPTV.

Figure 3:
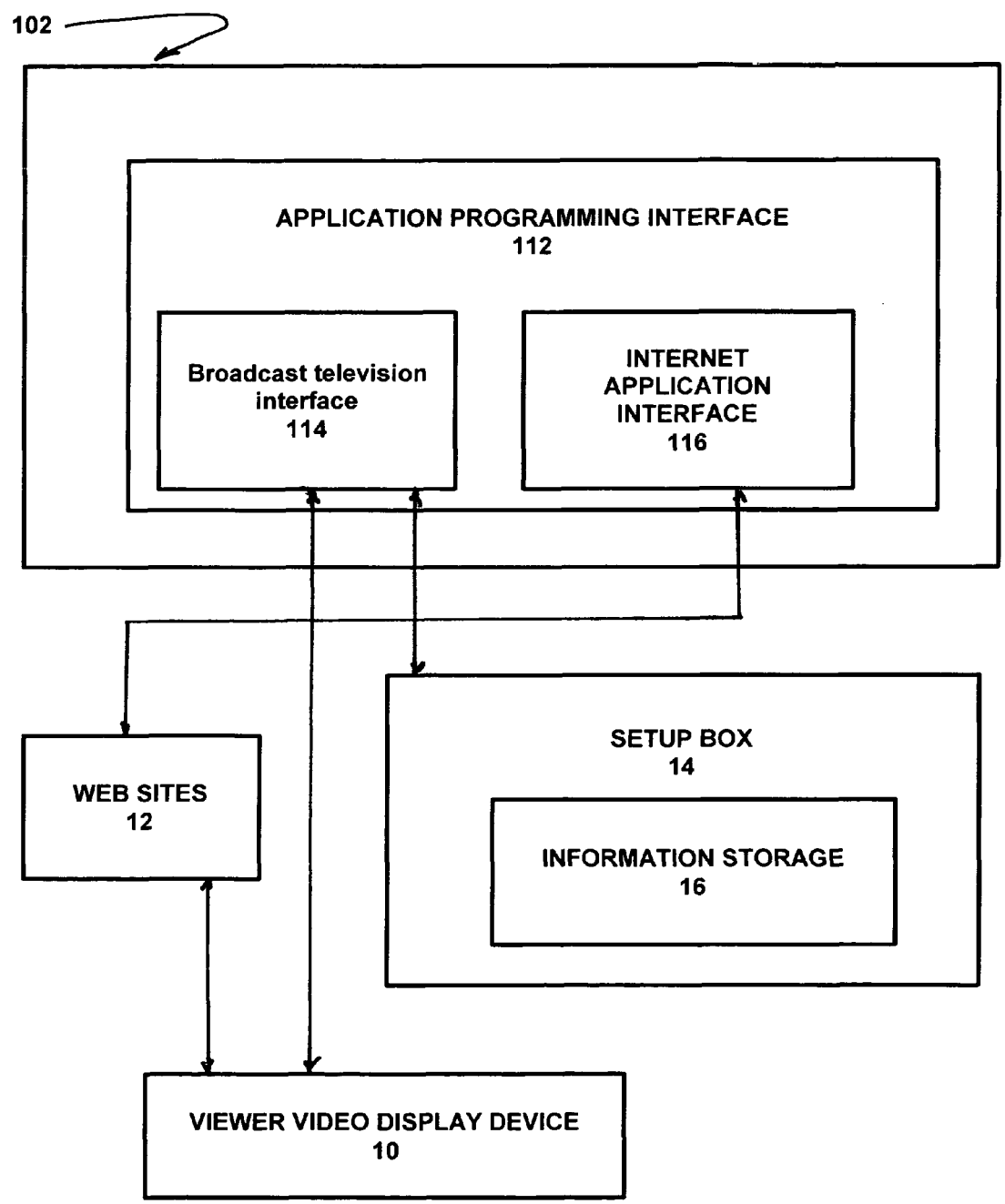
FIG. 3 is a diagrammatic representation showing the application programming interface having a broadcast television interface and an internet application interface for communicating with a viewer's video display device.

As illustrated in FIG. 3, in a preferred embodiment, the application programming interface 112 is coupled to a viewer's video display device 10, such as a television, by either a Set-Top Box 14 or the display device 10 is an Internet-capable television connected to the Internet. In a preferred embodiment of the invention, the television is coupled to the Internet I such that constant interaction is provided. In another preferred embodiment of the invention the viewer's video display device is connected to a set-up box 14 that preferably includes a conventional information storage apparatus 16 capable of intermittently caching relevant information until the application programming interface 112 makes transmittal contact, such as with the Internet I, and operates to transmit stored cached information to the application programming interface module 112. In another preferred embodiment of the invention, the viewer's video display device 10 comprises other forms of devices that can display video media and are connected continuously or periodically to the Internet. Such devices include, cellular telephones, computers, personal digital assistants ("PDA"), video game consoles, and other such devices.

Figure 4:
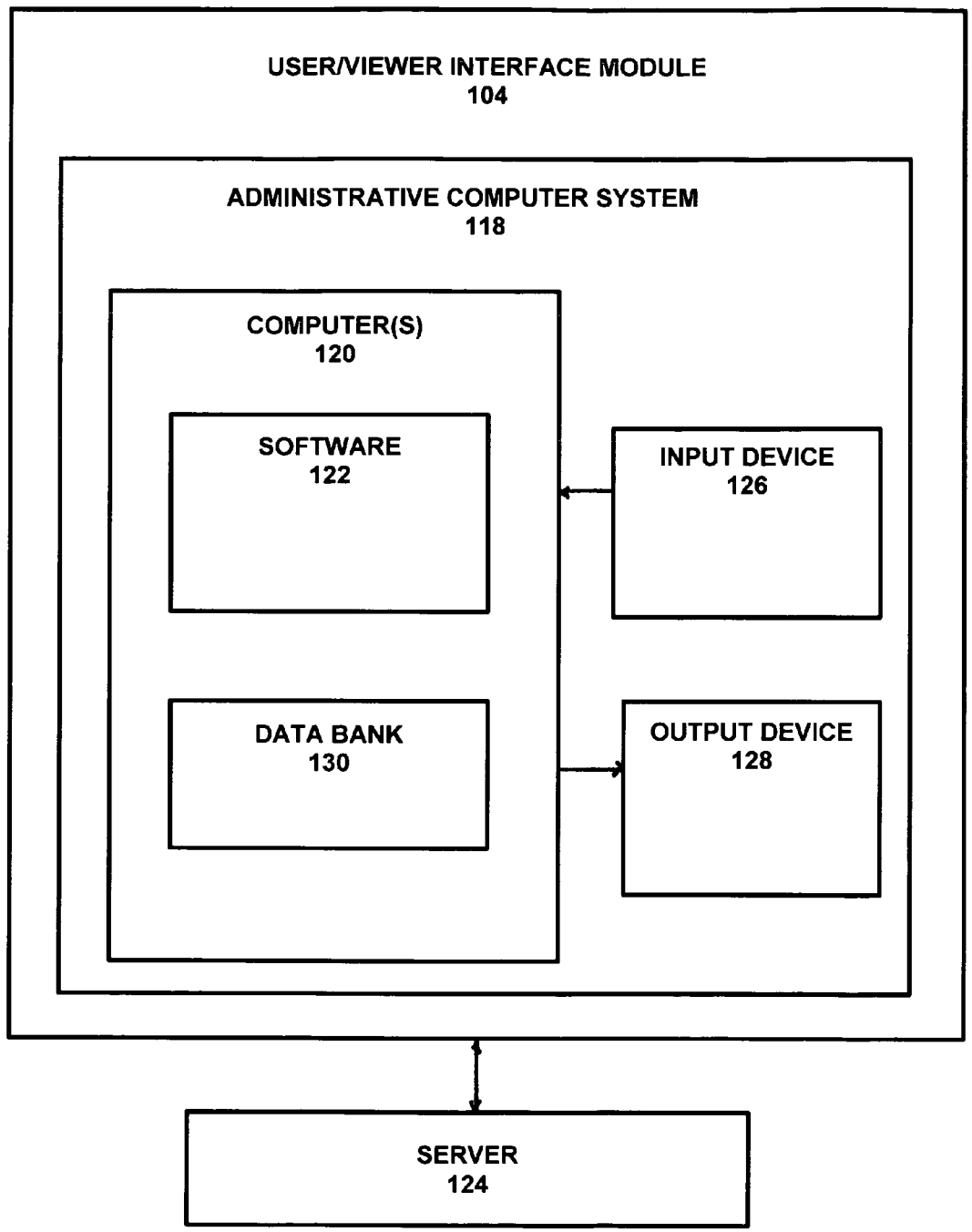
FIG. 4 is a diagrammatic representation of a preferred embodiment of the user/viewer interface module of FIG. 1 showing the administrative computer system.

Referring to FIG. 4, the user/viewer interface module 104 comprises an administrative computer system 118 comprising one or more computers 120 for implementing and operating the system software 122 that operates the framework 101 of the subject invention such that the various modules cooperate together. The user/viewer interface 104 and the viewer interface module 102 are each electrically linked to at least one server 124 connected to the Internet I to assess, retrieve and transmit information. The computer system(s) 118 is electronically coupled to suitable input device 126, like a keypad, touch screen, or any other suitable input device that can accept information, and one or more suitable output devices 128, such as a computer display, printer, and the like. The administrative computer system also includes at least one data bank 130 for storing various information, including information concerning users, viewers, and business information. It should be understood that the administrative computer system 118 can include various combinations of such conventional components, peripherals, and devices. Preferably, the administrative computer system 118 operates under the control of an operating system, such as the WINDOWS operating system developed by Microsoft Corporation or the MACINTOSH operating system developed by Apple Computer Corporation. It should be understood, however, that other operating systems could be utilized to implement the system software 122 of the advertising and marketing system 100 of the present invention.

The system software 122 preferably is a computer-readable medium having computer-readable instructions for performing a method of operating the interactive advertising and marketing system, including providing support for creating and/or editing hotspots, determining coordinates of objects within a video media, and performing and coordinating the activities of the various modules comprising the system. Preferably, the system software 122 is also an interactive, menu and event driven system that cooperates with the server 124 (FIG. 4) for using conventional type of prompt, dialog, and entry windows to guide a user to enter information for facilitating communications and information exchange between individual users, viewers, and the interactive advertising and marketing system 100. As used herein, the term "software" refers to any form of programmed machine-readable language or instructions (e.g., object code) that, when loaded or otherwise installed, provides operating instructions to a machine capable of reading those instructions, such as a computer. The system software 122 of the present invention can be stored or reside on, as well as be loaded or installed from, one or more floppy disks, optical disks, hard disks or any other form of suitable non-volatile electronic storage media and can also be installed by downloading or other form of remote transmission, such as by using Local or Wide Area Network (LAN or WAN)-based, Internet-based, web-based or other remote downloading or transmission methods. It should be understood that the system software 122 can be a single program or can be a combination of existing software such as identified herein that operate together under a framework to perform the operations described herein.

In operation, as illustrated ins FIGS. 1-4, the user/viewer interface module 104 sends and receives messages and data to and from viewers through the viewer interface module 102. The user/viewer interface module 104 can also send and receive messages and data to and from users through the content collaboration module 106. It should be understood that the viewer interface module 102 and the user/viewer interface module 104 operates bi-directionally between a variety of messaging protocols, including Email, SMS text, various social networks, as well as proprietary Internet chat protocols, such as SKYPE and AOL's Instant Messenger system and other similar systems. The messages and data can then be made available to viewer's and user's display devices through the user/viewer interface module 104.

Figure 5:
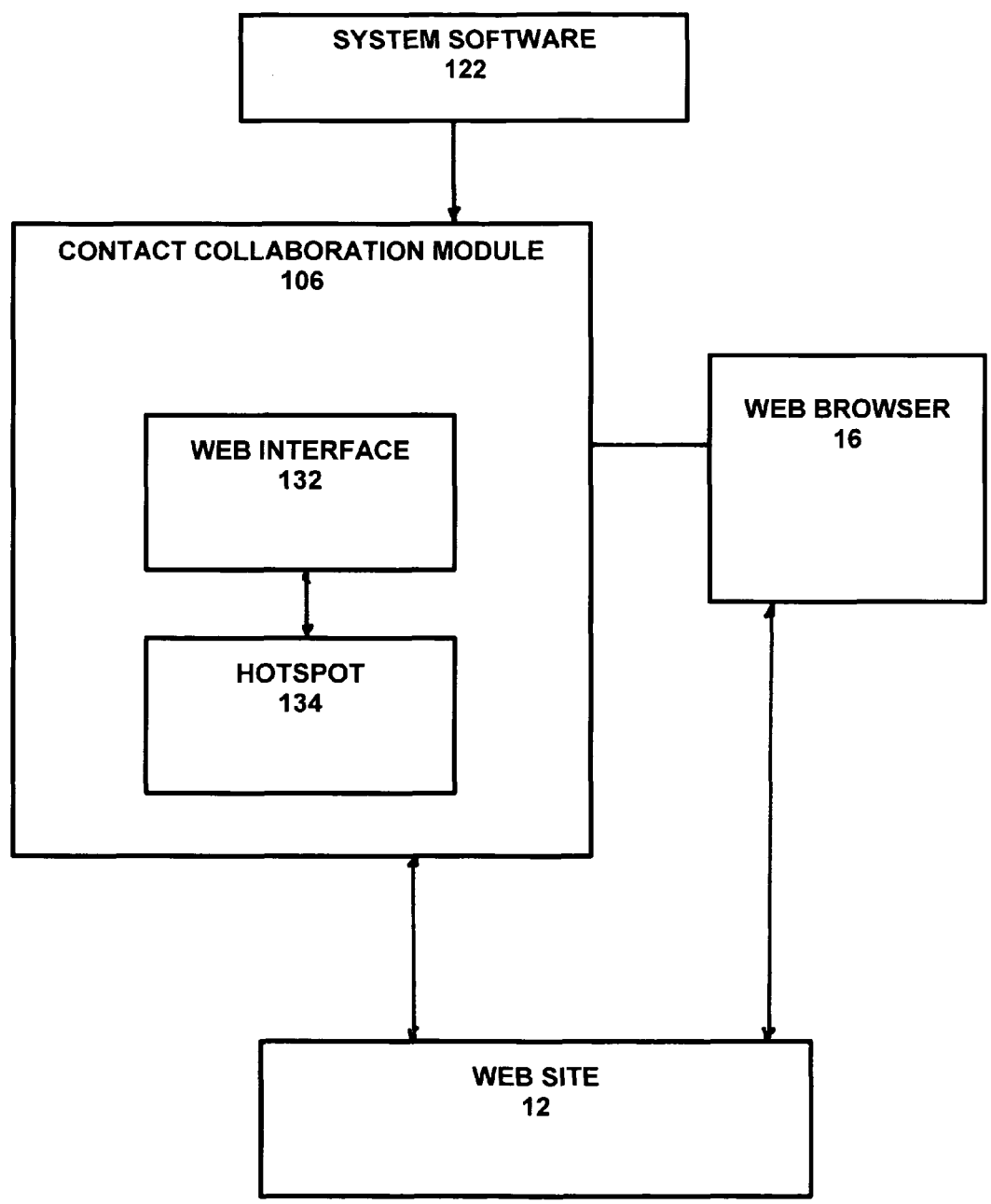
FIG. 5 is a diagrammatic representation illustrating the content collaboration module to create and manage points-of-sale and advertising campaigns as well as video hotspots that can be linked to a user's existing website.

Referring to FIGS. 1 and 5, the content collaboration module 106 is shown for providing services to users. In operation, the content collaboration module 106 allows users to utilize a conventional web browser 16 to create and manage points-of-sale and advertising campaigns. The system software 122 directs the content collaboration module 106 to create a video hotspot 134 that can be linked directly to a user's existing website 12 using standard Uniform Resource Indicator/Locator protocols. The video hotspots 134 are also displayed as a set of visual points along a timeline, which displays a time image. This results in users not needing to know any programming languages to utilize the interactive advertising and marketing system of the present invention. In another preferred embodiment, the system also operates to allow users to import data to the timeline in the form of XML (i.e. time events as SMIL, or shapes (hotspots) as SVG). In another preferred embodiment of the invention, the system software also directs the content collaboration module 106 to operate and allow a user to upload and import graphics that can be displayed, such as over a digital video medium, in real-time. It should now be understood that the graphics can be used as icons, banner ads, messages, and stencils that appear over top of live television. For an illustrative example, a can of beverage can be "re-labeled" with such stencils.

In another preferred embodiment of the interactive advertising and marketing system of the subject invention, the system software 122 also directs the collaboration module 106 to collect and collate reported information and data, which can be transmitted to users. This information can then be used by users in evaluating the advertising value created, hence "analytics." Such information can be obtained from advertising hosts, such as websites that provide video media that can include the number of individuals viewing the video media, track of the number of objects and the particular objects being selected by a viewer of a video media, as well as the demographics of the individuals viewing the video media, and other information that may be of interest to users. This information can then be used to tailor marketing and advertising activities to specifically attract specific types of viewers. Further, users can define parameters to allow them to target viewers falling within a set of demographics.

The financial transaction module 110 of the interactive advertising and marketing system 100 operates to allow viewers to make transactions with specific users. Viewers selecting objects viewed on a video media can select or "click" on the object and purchase it from the user or can request additional information from the user. The financial transaction module communicates with the user/viewer interface module 104 and utilizes various conventional software applications, such as online shopping carts, online banking systems, and other well-known systems for making financial transactions. In another preferred embodiment, the financial transaction module 110 operates in conjunction with conventional e-commerce businesses allowing payments and money transfers to be made through an Internet third-party, such as PAYPAL from eBay Inc.

Figure 6:
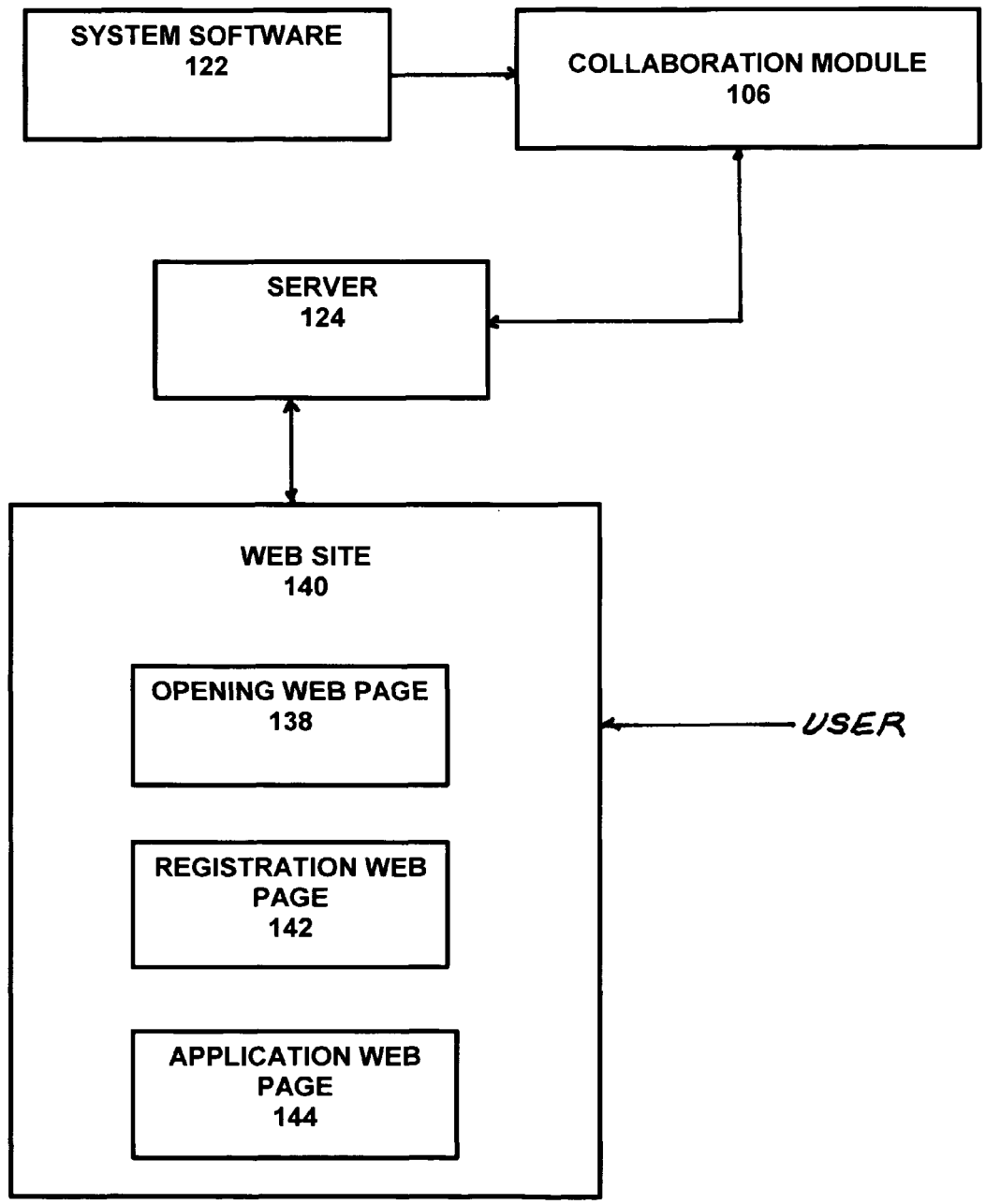
FIG. 6 is a diagrammatic representation illustrating the content collaboration module in communication with a website for use by users.

In a preferred embodiment of the invention, as shown in FIG. 6 a user wishing to utilize the interactive advertising and marketing system 100 first accesses the system through the content collaboration module 106 through a user's portal or access, such as through an interactive opening web-page 138 (e.g. HTML page) accessible through the Internet. The system software 127 operates to permit the user to register itself with the system and to perform the specific operations as fully described. To initiate the system, the user obtains access to system through server 124 via the Internet to obtain access to the system's website 140 hosted by the server 124. The system software 127 directs the server to display the opening web-page 138 (e.g. HTML page) that provides the user with various options that allows a user to perform various operations such as allowing the user to add, subtract and edit the user's various hotspots in various digital video media stored within the database or cloud 108, or to download graphical labels or screens which may be conventionally superimposed into a video media, or obtain business information, such as general information of interest to businesses that may include information relating to various advertising media, available hotspot space, cost information, demographic information, and statistical information relating to the user's advertising (such as number of viewers, demographics of viewers, etc.) stored in the data bank 130 of the administrative computer system 118. The opening web-page 138 also provides means whereby the user can request to become a client for access and use of the system. Upon request by the user, such as by selecting a "sign-up" field, the content collaboration module operates to automatically direct the system server 124 to display on the user's output device 18 a registration web-page 142 (e.g. HTML page). The user can then register with the system and preferably receive a customer identification number and obtain a security password. If the user has already registered with the system, the user can at the opening web-page 138 skip the registration process after inputting the appropriate sign-in information and select an appropriate field at the opening web-page 138 to prompt the content collaboration module 106 to display on the user's output device 18 the operations 144 web-page for use by the user in creating, adding, subtracting, modifying hotspots as well as obtaining various business information.

Figure 7:
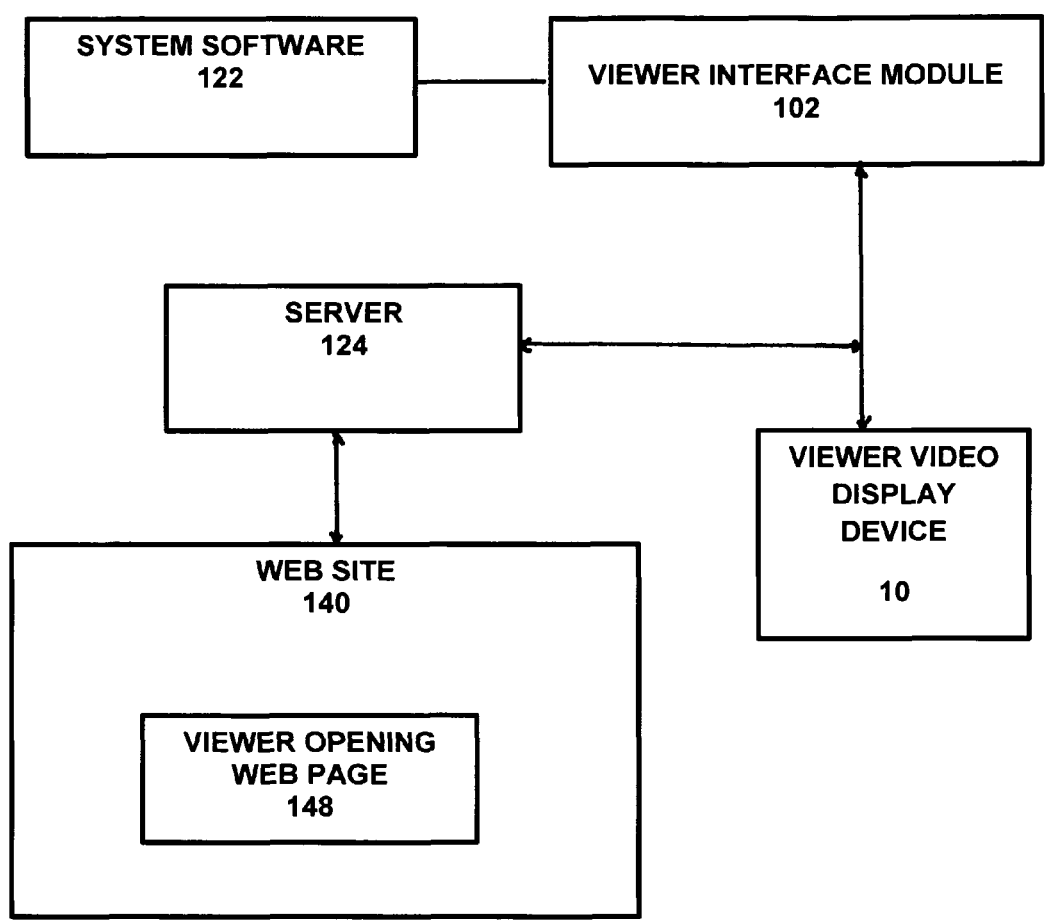
FIG. 7 is a diagrammatic representation illustrating the viewer interface module for communicating with viewers.

In a preferred embodiment of the invention, as shown in FIG. 7, a viewer wishing to utilize the interactive advertising and marketing system first accesses the system through the viewer's interface module 102 through a viewer's portal or access, such as through an interactive web-site 140 (e.g. HTML page) accessible through the Internet or the viewer's display device 10 that is connected to the Internet. The system software 122 than operates to permit the viewer to register with the system, i.e such as by FACEBOOK, GOOGLE, TWITTER or other such Internet web services. To initiate the system, the viewer obtains access to the system through server 124 via the Internet to obtain access to the system's website 140 hosted by the server 124. The system software 122 directs the server to display a viewer opening web-page 148 (e.g. HTML page) that provides the viewer with information concerning the operation of the system and requests information from the viewer including the types of video display devices that will be used by the viewer, demographic information, and other pertinent information.

Figure 8A:
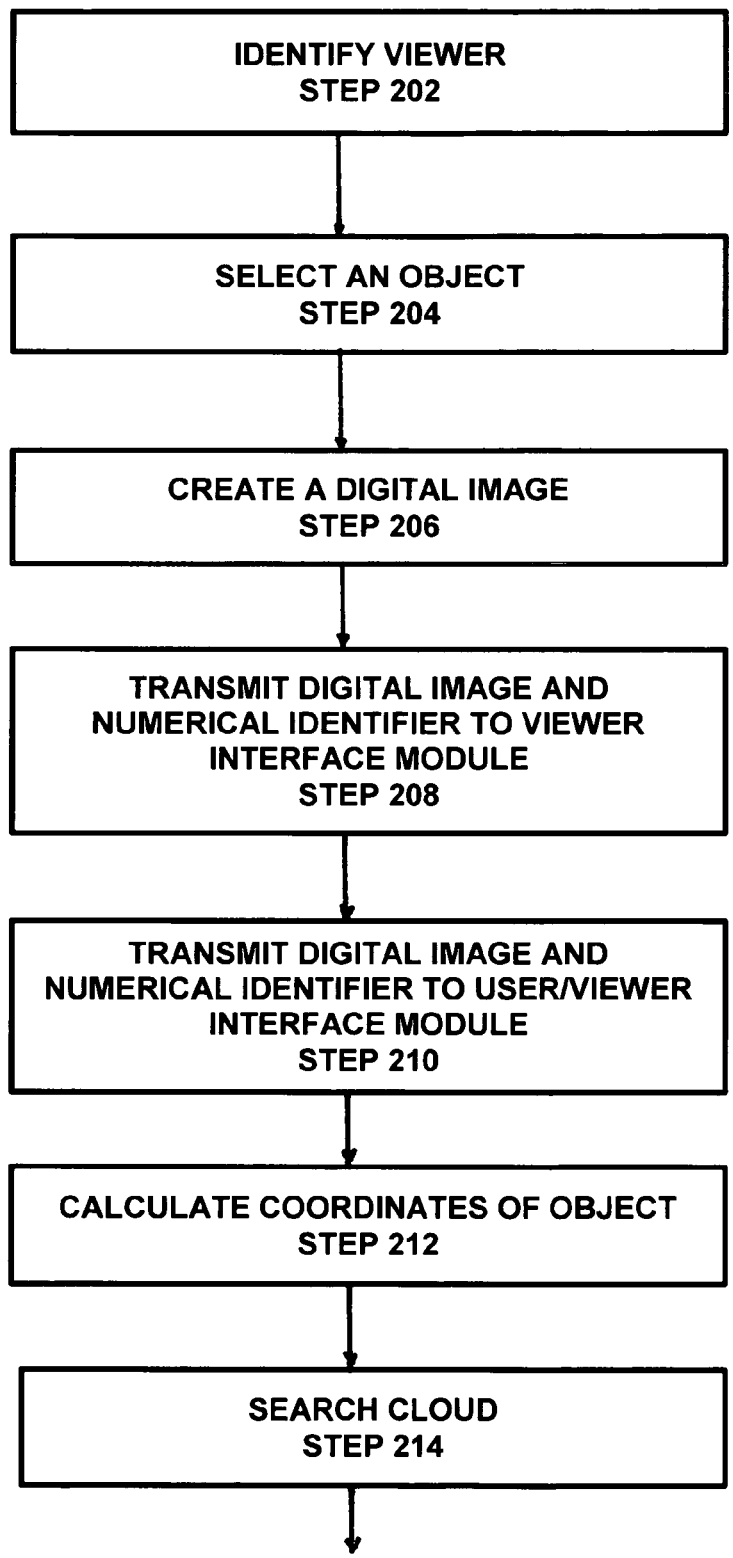
FIG. 8a is a flow diagram illustrating the general methodology of a preferred embodiment showing the procedure being directed using the system software for allowing a viewer to select an object displayed in a video media and "clicking" on the object to purchase or obtain more information on the object.
Figure 8B:
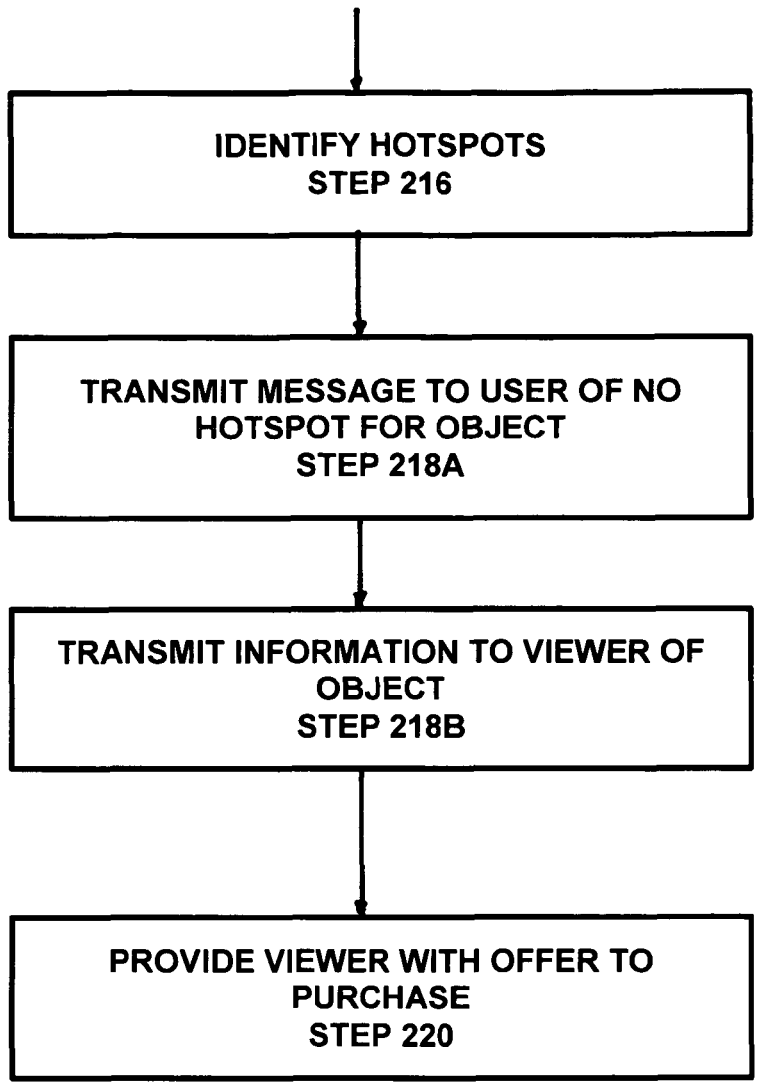
FIG. 8b is a continuation of the flow diagram of FIG. 8a illustrating the general methodology of a preferred embodiment showing the procedure being directed using the system software for allowing a viewer to select an object displayed in a video media and "clicking" on the object to purchase or obtain more information on the object.

In order to better understand how all of the various modules, components and devices cooperate and work together, the following exemplary illustration of the general overall operation of the interactive advertising and marketing system of the subject invention is provided. A user through the user's video display device 10 communicates with the system 100 though the viewer interface module 102. Depending on the type of display device 10 being used by the viewer, the system software 122 directs the application programming interface 112 to utilize either the broadcast television interface 114 or the internet application interface 116 (FIG. 3). It should be understood that the viewer video display device 10 can be Internet ready such that it is in communication with the Internet or utilizes a set-top box 14 to make communication with the viewer interface module 102 via the Internet I. In a preferred embodiment, as illustrated in FIGS. 8a and 8b, the viewer has been provided with identification information such that when the viewer's display makes contact with the viewer interface module 102, the particular viewer is identified (Step 202). Preferably, the viewer's identity is automatically transmitted to the interactive advertising and marketing system 100, such as by use of the set-top box 14 or by the viewer video display device 10.

Figure 9:
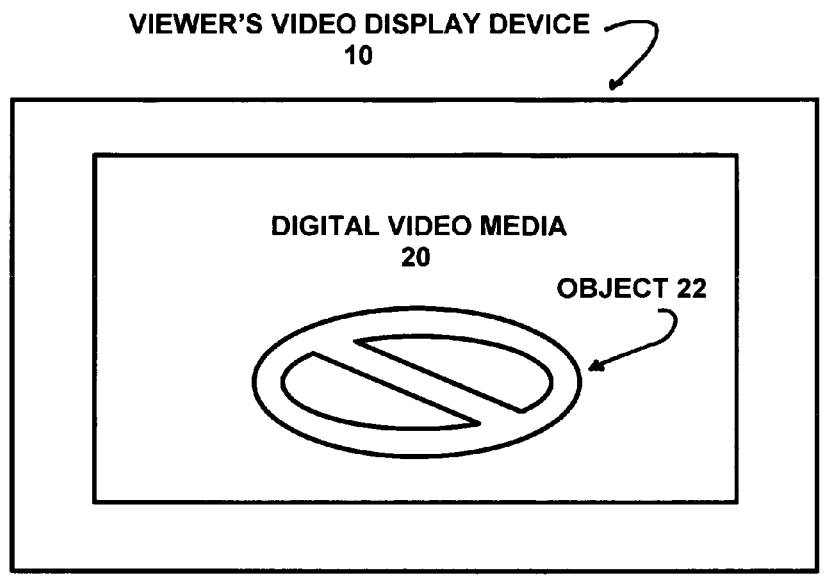
FIG. 9 is a diagrammatic representation illustrating a typical viewer's display device having a video media being displayed thereon and showing an object of interest.

As illustrated in FIGS. 8a-9, in the event a viewer is watching a video media 20 on the viewer's video display device 10, the user may utilize a cursor, mouse, touch (for touch-sensitive displays), motion (for motion-sensitive remotes) or other conventional and nonconventional means for identifying (selecting) an object 22 on the video display device 10, such as by "clicking" on the object 22 in the video media. 20 (step 204). As used herein the term "clicking" shall include the selecting of an object using the appropriate means for the viewer's display device. Clicking on the object 22 causes the system software 122 to operate and create an image or "snap-shot" 150 of the video media 20 and the "clicked" object 22 (step 206) which together with identifying information is then transmitted to the viewer interface module 102 as described (step 208). Upon receiving the video image or snap-shot 150, the viewer interface module 102 operates to transmit the video image and the identifying information to the user/viewer interface module 104 (step 210). It should be understood that identifying information may include a numerical identifier 152 for the particular video media, name of the source of the video media, title, time code of the "click", dates, the positional coordinates of the "click", and other relevant information for identifying the particular video media (hereinafter referred to as the "digital image identifier"). It should be understood that in a preferred embodiment of the invention, the viewer can "click" anywhere on the video display 24 of the video media 20 thereby operating as a message to users that can respond as described.

Figure 10:
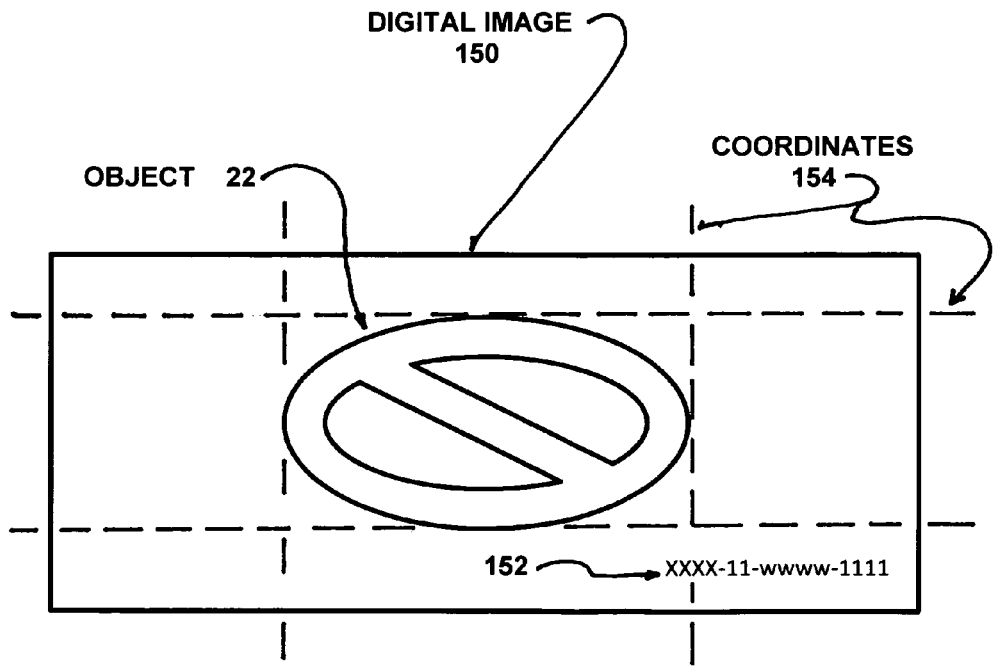
FIG. 10 is a diagrammatic representation illustrating a preferred embodiment of an image or "snap shot" taken of the video media of FIG. 9 showing the object of interest and coordinates of the object being determined in relation to the image.
Figure 11:
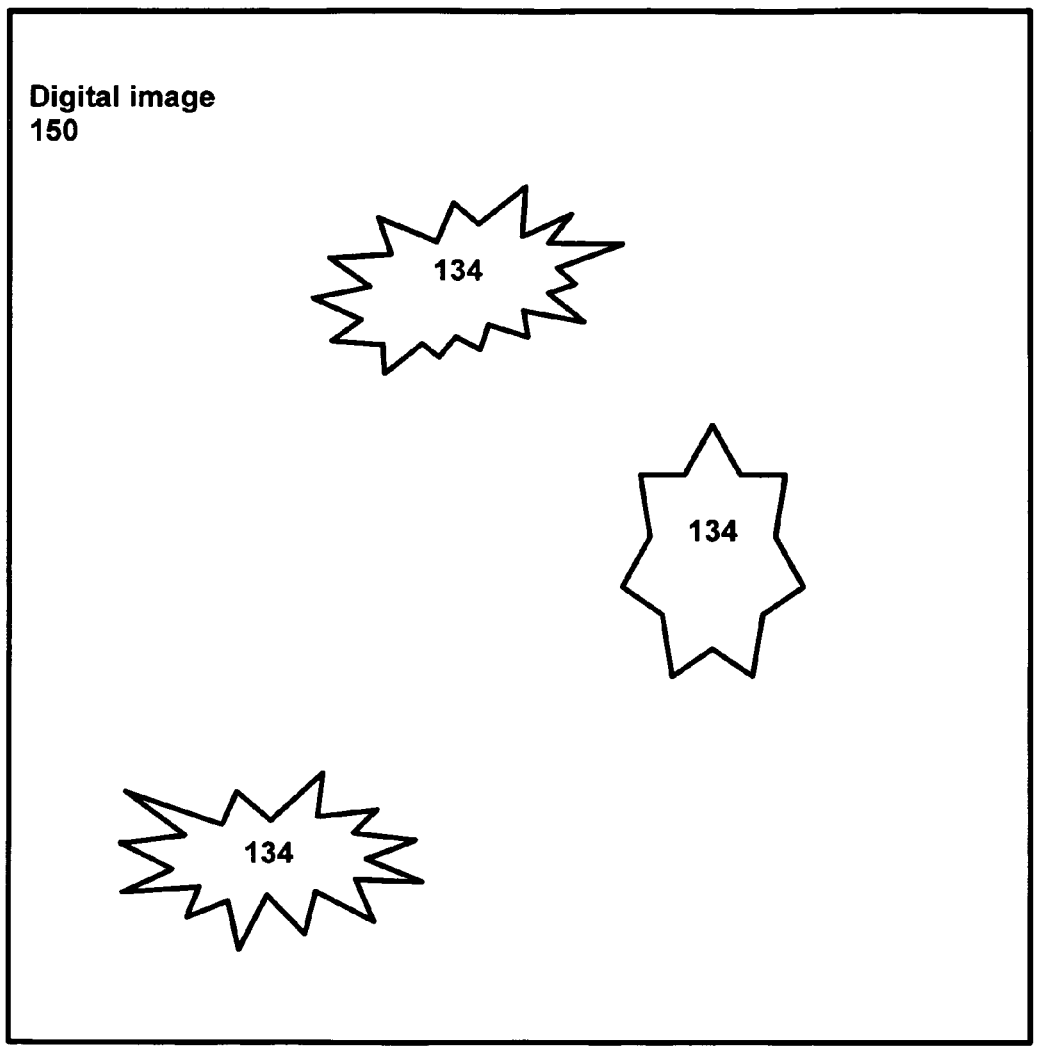
FIG. 11 is a diagrammatic representation illustrating a video image having one or more hotspots.
Figure 12:
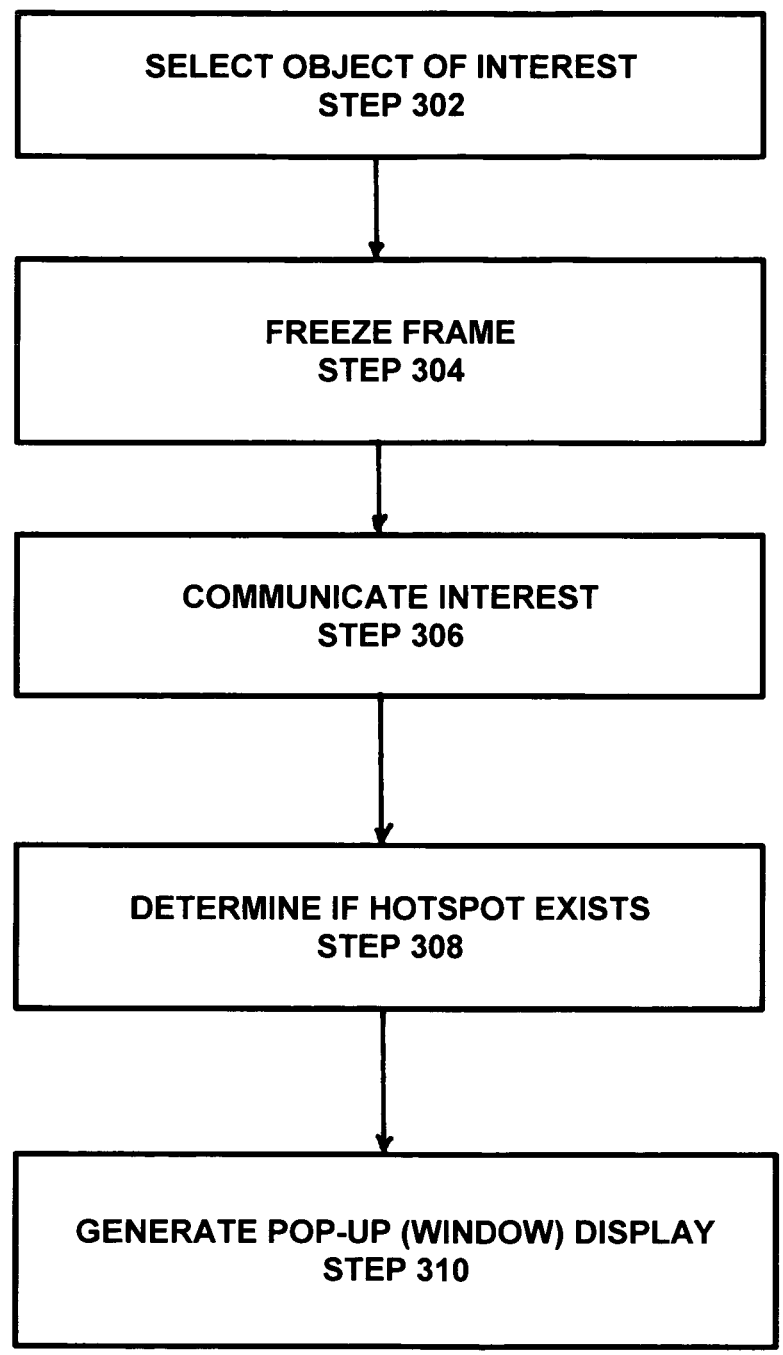
FIG. 12 is a diagrammatic illustration of a preferred embodiment of the invention showing a viewer's display device having a video media being displayed thereon.

The user/viewer interface module 104 after receiving the video image or snap-shot 150 and the numerical identifier 152, the system software 122 operates to cause the system 100 to calculate the coordinates 154 of the "clicked" object 22 identified with respect to the video image or snap-shot 150 (Step 212). The user/viewer interface module 104 also searches the database "cloud" 108 to find and obtain a copy of the video media using the video image or snap-shot 150 together with other information contained in the numerical identifier 152 as references (step 214). The system software 122 then directs the interface module 104 using the copy of the video media and the calculated coordinates 154 of the "clicked" object, identifies if a hotspot 134 (FIGS. 8 and 10) exists at the calculated coordinates 154 for the digital image or snap-shot 150 (step 216) for the object 22. If no hotspot exists for the object 22 in that particular video media 20, the user/viewer interface 104 dispatches a message to the viewer interface module 102 that receives the message and transmits the message to the viewer through the viewer's video display device 10 (step 218a) that no product information is available or other such prompt. If a hotspot 134 does exist for the object 22, the user/viewer interface 104 transmits a message to the viewer interface module 102 that receives the message and transmits the message to the viewer through the viewer's video display device 10 (step 218b) that prompts the opening of a dialogue 156 (FIG. 13) such as a window. The dialogue 156 can request additional information from the viewer, or ask if the viewer wishes to purchase the object, or if the viewer wishes to receive additional information concerning the object. It should be understood that the message to the viewer transmitted by the user/video interface 104 is not limited to any particular request but can be vary depending of the particular object selected and the user. If the viewer wishes to purchase the "clicked" object, viewer so indicates and the system software 122 activates the financial transaction module 110 such that the viewer is connected with a third-party ecommerce merchant (such as AMAZON (Amazon Services LLC), eBay (eBay Inc.), ITUNES (Apple Inc.), PAYPAL (Paypal, Inc.) and the like) for making payment for the selected object (step 220). It should be understood that if no hotspot exists for the selected object, the system can operate to track the object and the viewer and provides information to users that may be interested in responding to or contact the viewer or provides information to users that may be interested in creating a hotspot for the selected object. It should also be understood that if no hotspot exists for the calculated coordinates for the viewer's "click," the system can operate to store the information and allow a user or an automated process to review the stored information and/or allow the user to respond to the viewer.

In another exemplary illustration of a preferred embodiment of the invention, as illustrated in FIGS. 8-12, a video media 20, as shown, is being played on a viewer's video display device 10. At some point during the viewing of the video media 20, the viewer selects "clicks" an object of interest 22 being shown in the video media 20 by using the appropriate device, such as a mouse, wand, pointer, touch sensitive screen or other similar device (step 302). In a preferred embodiment, selection of the object 22 causes the system software 122 to freeze the frame of the video media 20 showing the object 22 (step 304). The viewer can then determine if he/she is interested in purchasing the object 22, obtain additional information about the object or communicate with other viewers concerning the object (step 306). As previously described, the system operates to identify the object 22 and determines if a hotspot 134 exists for the selected object 22 (step 308). In a preferred embodiment of the invention the object 22 would appear as a separate frame while the video media 20 continues being shown on the rest of the viewer's video display 24 or recorded such as by the viewer's video display device 10, or use of a video recorder or other device capable of recording video (not shown). If the system determines and identifies a hotspot 134 for the selected object 22, as shown in FIGS. 8-13, the system software 122 operates to generate a dialogue or window 156 (FIG. 13) on the viewer's video display device 10 (step 310). As shown, in a preferred embodiment the object 22 selected is identified together with other information 158, such as price, manufacture, product description and the like. In another preferred embodiment of the invention, messages and data can be made available to the viewer through the viewer's display device 10 generated by the user/viewer interface module 104. This permits the viewer to receive real-time information concerning the selected object. It should be understood to one skilled in the art that the interactive advertising and marketing system 100 operates such that when a viewer clicks on a selected object the user/viewer interface module 104 can operate to provide users that created a hotspot for the selected object with information concerning the viewer. This information can include the viewer's contact information. In a preferred embodiment the system operates to automatically review the information and provide an automatic response. In another preferred embodiment the information is simply reviewed by a user and the user provides a response to the viewer. In a preferred embodiment of the invention, users can provide viewers advertising that can include downloadable/printable material, such as coupons, maps, product information, and the like, such as by use of the viewer's video display device. In another preferred embodiment of the invention, users can provide the viewer an Internet link or hyperlink for allowing the viewer to view the user's web-page or bring up information, such as through the use of a "pop-up" or window.

Figure 13:
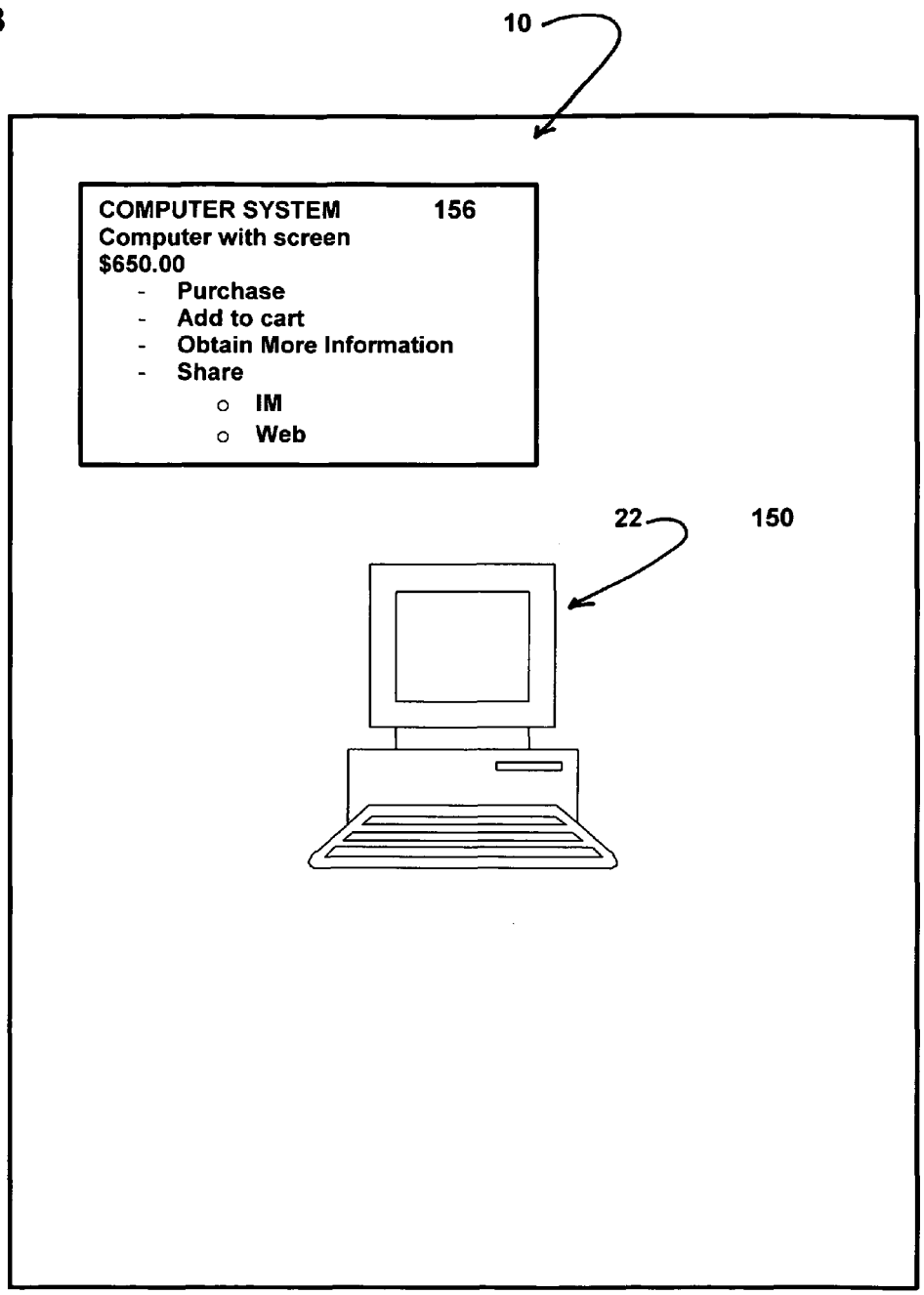
FIG. 13 is a diagrammatic illustration of a preferred embodiment of the invention showing a video image displayed on a viewer's video display device having a dialogue ("pop-up" or window) for providing the viewer with options.

In another preferred embodiment of the invention, the interactive advertising and marketing system operates to allow viewers to exchange messages and preferably video media sharing, including computer-computer, computer-phone, phone-computer, and text messaging video media, to other viewers using conventional messaging systems, such as, but not limited to, TWITTER from Twitter, Inc., YAHOO IM from Yahoo! Inc., YOUTUBE from Google Inc., and FACEBOOK from Facebook, Inc. As shown in FIG. 13, the system operates to allow the viewer to select and utilize the desired messaging system by simply clicking onto the desired system.

It should now be understood to those skilled in the art that the subject invention is an interactive advertising and marketing system for use by users for advertising and marketing objects in a video media and by viewers for selecting such objects. Preferably the system comprises a cloud having a plurality of hotspots, each hotspot is directed to a corresponding object, a viewer video display device operable for receiving and displaying a video media, a selection device for selecting an object in the video media, and a system framework in communication with the cloud and the viewer display device that is operable for determining if a hotspot exists for the selected object. Preferably, if a hotspot exists for the selected object, the user/viewer module directs the video display device to generate a dialogue for allowing a viewer to correspond with a user. In a preferred embodiment, the viewer video display device is selected from the group consisting of televisions, cellular telephones, computer displays, personal digital assistants, and video game consoles. In one preferred embodiment, the viewer display device is a touch screen tablet computer device, such as an IPAD or IPAD2 from Apple, Inc. The video media would be provided by a cable television operator, such as provided by Time Warner Cable, Inc. Hotspots can then be created by users and overlaid over the video media. In another preferred embodiment of the invention, the viewer display device is a touch screen tablet computer device, such as the IPAD or IPAD 2 from Apple, Inc. The video media is obtained through a website, such as HULU (www.hulu.com) in a video format such as MPEG-4 as specified by the Moving Pictures Expert Group. Hotspots can then be created by users and overlaid over the video media. In a preferred embodiment the video media would be provided by a video streaming service such as NETFLIX from Netflix, Inc. IT should now be understood to one skilled in the art that regardless of the video format provided by such a streaming service, the subject invention would operate to provide hotspots created by users that can be overlaid over the video media. In another preferred embodiment of the invention the system framework operates to allow users to add, subtract, or modify hotspots for objects stored in the cloud. Further, the system framework operates to record the demographics of viewers and video media being viewed by the viewers. Preferably, the system framework also operates to connect the viewer video display device with a user website. In a preferred embodiment of the invention the digital video media is a live broadcast.

A preferred embodiment of the invention is a method of advertising and marketing comprising the steps of identifying a viewer, the viewer selecting an object in a video media, calculating the coordinates of the selected object, using the coordinates to identify any hotspots for the object in the video media, using the hotspot to identify the object and a user associated with the object, and providing a connection whereby a viewer can contact the user. Preferably, the video media is being displayed on a viewer's display device. In a preferred embodiment, a viewer can contact the user in the form of a dialogue, such as a window, appearing on the viewer digital display device. In another preferred embodiment, a viewer can contact the user in the form of a dialogue, such as a window, appearing on the viewer digital display device. In another preferred embodiment, the connection allows a viewer to receive and transmit messages to a user and a viewer to receive and transmit messages to other viewers. Preferably, the method includes the step of uploading graphics to be displayed over the video media.

Another preferred embodiment is a method of advertising and marketing comprising a framework for performing the steps of selecting at least one object in a video media, overlaying a hotspot for each selected object in a video media such that the hotspots overlay the video media, and viewing the video media on a viewer video display by the viewer wherein when the object is selected, the framework operates to provide communication between the user and the viewer.

It should now be apparent that the interactive advertising and marketing system of the subject invention provides an interactive system having software that utilizes a graphic user interface formatted to function with a wide variety of input devices. It should now be apparent to one skilled in the art that the interactive advertising and marketing system of the subject invention allows hotspots to be incorporated across any video media. Unlike prior methods using hotspots whereby video media are incorporated with embedded hotspots, the system of the subject invention utilizes a cloud whereby objects within a video media are selected by a viewer and are identified by the system to determine if a hotspot has been provided for the selected object. In this way the hotspots are basically overlaid onto the video media rather than incorporated into the video media. It should also now be apparent to one skilled in the art that by overlaying hotspots over the video medial (hotspot is acting independent of the video media), rather than by embedding hotspots into a video media, allows hotspots to be utilized for any video media, including live broadcasts. The system allows users to be able to access the system from any ordinary web browser to create and manage points-of-sale and advertising campaigns. Video hotspots can be linked directly to a user's existing website using standard Uniform Resource Indicator/Locator protocols. The hotspots can also be displayed as a set of visual points along a timeline displaying a time index. Further, it should also now be apparent that the system allows users to upload and import graphics that can be displayed over video in real time. Such graphics can be used as icons, banner ads, messages, or stencils that appear over-top of live television as well as recorded video media. The system software also allows for the collecting and collating of data for use by users in analyzing the effectiveness of their advertising. Further, the system operates to allow users to define parameters, such as specific demographics (geographical location, age ranges, gender, etc.).

It should also be understood that the interactive advertising and marketing system permits users and viewers to communicate through the use of various media including through web pages, Emails, TWITTER feeds, cellular transmittals, cellular text messages, Internet instant messages, and social and business network systems.

Although the foregoing invention has been described in some detail for purposes of clarity of understanding, it should be apparent that certain changes and modifications may be practiced within the scope of the appended claims. Furthermore, it should be noted that there are alternative ways of implementing the method and system for implementing the method of the present invention. Accordingly, the present embodiments and examples are to be considered as illustrative and not restrictive, and the invention is not to be limited to the details given herein, but may be modified within the scope and equivalents of the appended claims.

I claim:

1. An interactive advertising and marketing system for use by one or more users to advertise and market objects in a video media and by a viewer using a video display device for viewing the video media and for selecting objects within the video media to receive information about a selected object, the system comprising:

a collaboration module for use by one or more users having a database for storing a plurality of virtual hotspots for objects that act independently of the video media, said collaboration module further comprising system framework that communicates with said database and the video display device and having software that determines if for the object selected by the viewer using the video display device, a virtual hotspot exists for the object selected by the viewer in said database;

wherein if a hotspot exists for the object selected by the viewer, said system software transmits a message to the viewer's video display device and/or to receive a message from the viewer's video display device;

wherein if a virtual hotspot does not exist for the object selected by the viewer, said system software tracks the object and transmits information and data that relates to the selected object and is of interest to the one or more users for deciding if a hotspot should be created for the selected object;

wherein when the object is selected by the viewer using the video display device, the system software identifies the selected object and stores information for the selected object and creates a connection whereby the viewer and the one or more users exchange messages.

2. The interactive advertising and marketing system of claim 1 wherein said system framework communicates with a viewer video display device selected from the group consisting of televisions, cellular telephones, computer displays, personal digital assistants, and video game consoles.

3. The interactive advertising and marketing system of claim 1 wherein said system framework allows the one or more users to add new hotspots, or subtract or modify existing hotspots stored in said database using a server connected to the Internet.

4. The interactive advertising and marketing system of claim 1 wherein said content collaboration module allows the one or more users to display graphics over the video display device in real time.

5. The interactive advertising and marketing system of claim 4 wherein said display graphics are selected by the one or more users based on said information and data.

6. The interactive advertising and marketing system of claim 1 wherein the video media is a live broadcast.

* * * * *